United States Patent
Nachum et al.

(10) Patent No.: US 8,923,290 B1
(45) Date of Patent: Dec. 30, 2014

(54) SELF-FORMING LAGS

(71) Applicant: Marvell Israel (M.I.S.L) Ltd., Yokneam (IL)

(72) Inventors: Gai Nachum, Rishon Le Zion (IL); Robi Goldschlager, Tel-Aviv (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 14/185,311

(22) Filed: Feb. 20, 2014

Related U.S. Application Data

(60) Provisional application No. 61/776,349, filed on Mar. 11, 2013, provisional application No. 61/769,426, filed on Feb. 26, 2013.

(51) Int. Cl.
*H04L 12/28* (2006.01)
*H04L 12/24* (2006.01)
*H04L 12/937* (2013.01)

(52) U.S. Cl.
CPC .............. *H04L 49/253* (2013.01); *H04L 41/12* (2013.01)
USPC ........................................................ 370/389

(58) Field of Classification Search
CPC combination set(s) only.
See application file for complete search history.

(56) References Cited

U.S. PATENT DOCUMENTS

| | | | |
|---|---|---|---|
| 7,274,694 B1* | 9/2007 | Cheng et al. ................... | 370/389 |
| 2009/0109998 A1* | 4/2009 | Vinayagam et al. .......... | 370/465 |
| 2009/0225752 A1* | 9/2009 | Mitsumori ..................... | 370/390 |
| 2010/0135162 A1* | 6/2010 | Takase et al. .................. | 370/242 |
| 2011/0292787 A1* | 12/2011 | Kotrla et al. ................... | 370/216 |
| 2012/0087372 A1* | 4/2012 | Narasimhan ................... | 370/392 |
| 2012/0182872 A1* | 7/2012 | Wakumoto ..................... | 370/235 |
| 2013/0083797 A9* | 4/2013 | Narasimhan ................... | 370/392 |
| 2013/0148546 A1* | 6/2013 | Eisenhauer et al. ........... | 370/255 |
| 2014/0025736 A1* | 1/2014 | Wang et al. .................... | 709/204 |

* cited by examiner

*Primary Examiner* — Clemence Han

(57) ABSTRACT

Aspects of the disclosure provide a method for self-forming link aggregation (LAG). The method includes discovering, by a network switch, at least a first port and a second port managed by the network switch that are linked to another network switch. After the discovery, the method includes defining between the first network switch and the other network switch a single logical interface of which the first port and the second port are members, and communicating network traffic between the network switch and the other network switch over the single logical interface.

18 Claims, 4 Drawing Sheets

SELF-FORMING LAGS

INCORPORATION BY REFERENCE

This present disclosure claims the benefit of U.S. Provisional Application No. 61/769,426, "Self-forming lags" filed on Feb. 26, 2013, and U.S. Provisional Application No. 61/776,349, "Self-forming lags" filed on Mar. 11, 2013, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a network switch includes a plurality of ports to receive and transmit packets. In some situations, network engineers configure the network switch to pre-allocate multiple ports of the network switch to a link aggregation (LAG), and connect the multiple ports of the network switch respectively to multiple ports of another network switch to form the LAG. The LAG includes multiple network connections in parallel, increases throughput, and provides redundancy in case one of the network connections fails.

SUMMARY

Aspects of the disclosure provide a method for self-forming link aggregation (LAG). The method includes discovering, by a network switch, at least a first port and a second port managed by the network switch that are linked to another network switch. After the discovery, the method includes defining between the network switch and the other network switch, a single logical interface of which the first port and the second port are members, and communicating network traffic between the network switch and the other network switch over the single logical interface.

To define the single logical interface of which the first port and the second port are members, in an example, the method includes assigning a same actor value to both the first port and the second port. The actor value indicates a group for link aggregation. The method then includes allowing a link aggregation protocol to manage a membership of the single logical interface according to the assigned actor value.

According to an aspect of the disclosure, to discover, by the network switch, at least the first port and the second port managed by the network switch being linked to the other network switch, the method includes allowing a discovery protocol to discover a first link that links the first port to the other network switch and a second link that links the second port to the other network switch.

In an embodiment, the method includes receiving a first announcement packet from the other network switch via the first port, and receiving a second announcement packet from the other network switch via the second port. Further, the method includes storing, in a neighbor table, a first entry with an identifier of the other network switch and an identifier of the first port in response to the receiving of the first announcement packet, and storing, in the neighbor table, a second entry with the identifier of the other network switch and an identifier of the second port in response to the receiving of the second announcement packet. In an example, the method includes detecting entries in the neighbor table with the same identifier of the other network switch.

Further, in an embodiment, the method includes detecting a link status change in the network switch, re-discovering ports with parallel links to the other network switch and managing the membership of the single logical interface to the other network switch to include the re-discovered ports.

Aspects of the disclosure provide a network switch that includes a controller for self-forming LAG. The controller is configured to discover at least a first port and a second port managed by the network switch being linked to another network switch, define a single logical interface of which the first port and the second port are members, and communicate network traffic between the network switch and the other network switch over the single logical interface.

Aspects of the disclosure provide a non-transitory computer readable medium storing program instructions for causing a processor to execute operations for self-forming LAG. The operations include discovering, by a network switch, at least a first port and a second port managed by the network switch being linked to another network switch, defining a single logical interface of which the first port and the second port are members, and communicating network traffic between the network switch and the other network switch over the single logical interface.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
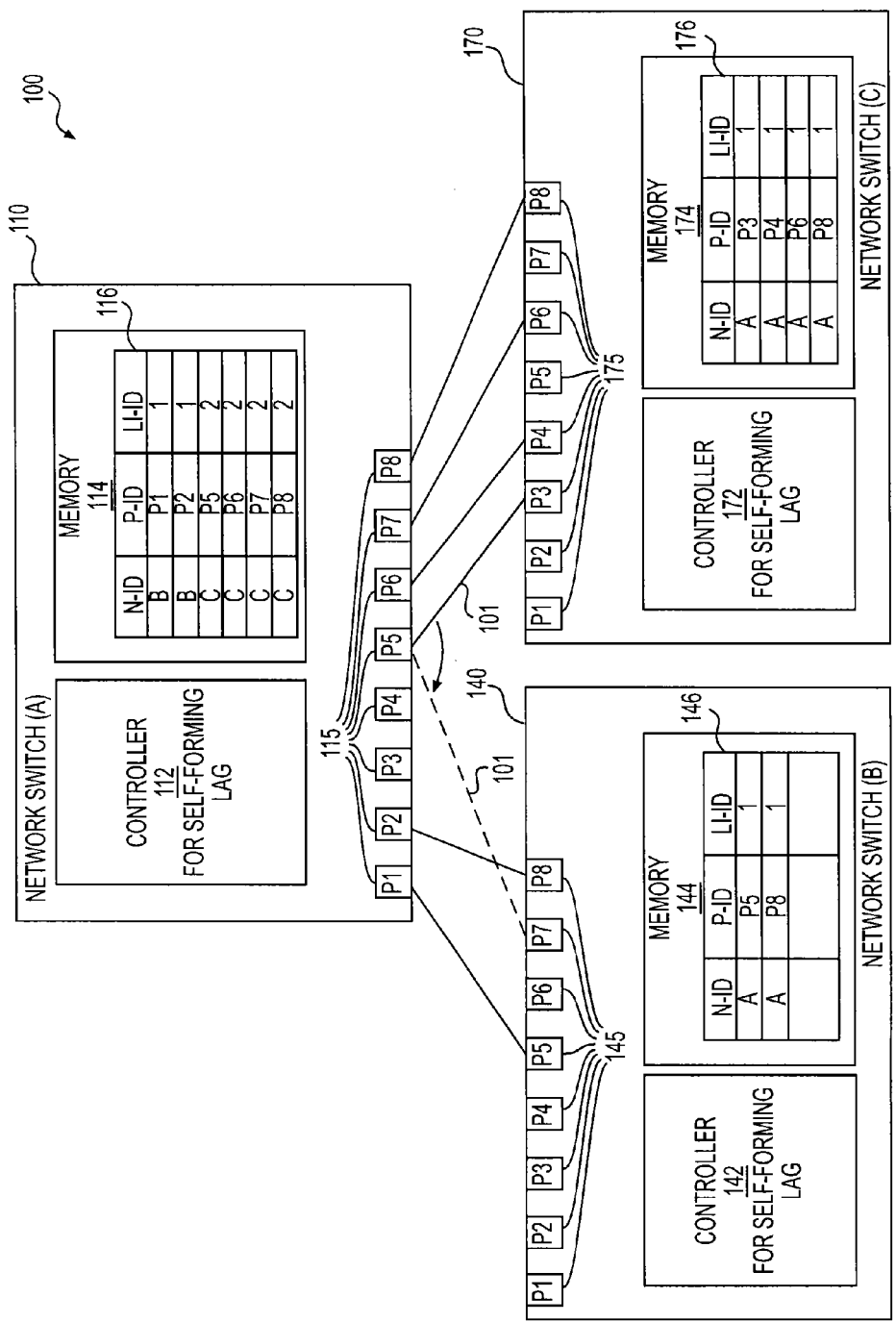
FIG. 1 shows a block diagram of a network example 100 according to an embodiment of the disclosure.

FIG. 1 shows a block diagram of a network example 100 according to an embodiment of the disclosure. The network 100 includes a plurality of devices, such as network switches 110, 140 and 170, host devices (not shown), and the like. At least two network switches are connected by multiple links. The two network switches are configured to form a link aggregation (LAG) that aggregates the multiple links by themselves respectively. Then the two network switches communicate network traffic over the LAG.

The network 100 can be any suitable network. In an example embodiment, the network 100 is a local area network (LAN) 100. The LAN 100 is a Layer 2 network that uses a data link protocol, such as Ethernet protocol, and the like, for communication between host devices in the LAN 100. The LAN 100 can be coupled to other suitable network.

Generally, a network switch includes a plurality of ports connected to host devices and or other network switches. The network switch is configured to receive a network traffic unit from a port (e.g., ingress port), and forward the received network traffic unit to one or more ports (e.g., egress ports) based on network configuration information. The network configuration information includes LAG configuration. In an example embodiment, multiple ports in a network switch are connected to ports of another network switch to form parallel links between the two network switches. The parallel links are aggregated, for example as a logical unit, to form a LAG. The network traffic between the two network switches are then communicated over the LAG.

According to an aspect of the disclosure, LAG configuration is self-formed in the network switches in the network 100 subsequently to physically coupling ports between the respective network switches. Then, the network switches forward network traffic based on the LAG configuration.

Specifically, in the FIG. 1 example, the network switch 110 includes ports 115, a controller 112 and a memory 114; the network switch 140 includes ports 145, a controller 142 and a memory 144; and the network switch 170 includes ports 175, a controller 172 and a memory 174. In an embodiment, each network switch includes an integrated circuit (IC) chip that integrates components of the network switch on the same IC chip. In another embodiment, the components of the network switch are integrated on multiple IC chips.

In the FIG. 1 example, the network switches 110, 140 and 170 are connected by links. For example, port P1 of the network switch 110 is connected to port P5 of the network switch 140 by a suitable cable, such as an Ethernet cable, to form a first link; port P2 of the network switch 110 is connected to port P8 of the network switch 140 by a suitable cable to form a second link; port P5 of the network switch 110 is connected to port P3 of the network switch 170 by a suitable cable to form a third link; port P6 of the network switch 110 is connected to port P4 of the network switch 170 by a suitable cable to form a fourth link; port P7 of the network switch 110 is connected to port P6 of the network switch 170 by a suitable cable to form a fifth link; and port P8 of the network switch 110 is connected to port P8 of the network switch 170 by a suitable cable to form a sixth link. In the network seen in FIG. 1, the first link and the second link connect plural ports of network switches 110 and 140 in parallel. The third to sixth links connect plural ports of network switches 110 and 170 in parallel.

According to an aspect of the disclosure, each of the network switches 110, 140 and 170 detects one or more neighbor network switches to which the network switch has multiple network connections (parallel links). For each neighbor network switch with multiple network connections, the network switch defines a single logical interface to include its ports to the multiple network connections in order to form a LAG to the neighbor network switch. Then, the network switch handles network traffic to and from the neighbor network switch based on the LAG.

In an example, in the network switch 110, the controller 112 detects that ports P1 and P2 are connected to ports of the network switch 140 and that ports P5-P8 are connected to ports of the network switch 170. In an embodiment, the controller 112 is configured to store the detected information in a table, such as a neighbor table 116 in the memory 114. Based on the detected couple port information, the controller 112 defines logical interfaces in order to form LAGs. According to an aspect of the disclosure, a single LAG is used between two directly connected network switches. In the FIG. 1 example, the controller 112 defines a first logical interface that includes ports P1 and P2 in order to form a first LAG between the network switches 110 and 140, and defines a second logical interface that includes ports P5-P8 in order to form a second LAG between the network switches 110 and 170. Subsequently to defining LAGs based on previously coupled ports, the network switch 110 handles the communication of network traffic to and from the network switch 140 based on the first logical interface, and handles network traffic to and from the network switch 170 based on the second logical interface.

Further, according to an aspect of the disclosure, the controller 112 is configured to detect a link status change, such as a link up (e.g., a coupling between a pair of ports forming a link) and/or a link down (e.g., unplugging of a cable), during operation, and then determine the ports that are actually linked and re-define the logical interfaces in response to the link status change corresponding to ports that are actually coupled. Thus, the network switch 110 can operate in a plug and play manner. In an example, during operation, an Ethernet cable 101 plugged in port P3 of the network switch 170 is unplugged and then re-plugged into port P7 of the network switch 140. The controller 112 detects a link down at port P5 of the network switch 110 to the network switch 170, and detects a link up at port P5 of the network switch 110 to the network switch 140. Then the controller 112 re-defines the first logical interface to now include only ports P1, P2 and P5, and re-defines the second logical interface to include only ports P6-P8.

The network switches 140 and 170 operate similarly to the network switch 110 described above. The network switches 140 and 170 also utilize certain components that are identical or equivalent to those used in the network switch 110; the description of these components has been provided above and will be omitted here for clarity purposes. When the Ethernet cable 101 is unplugged from the network switch 170 and then re-plugged into port P7 of the network switch 140, the controller 172 detects a link down at port P3 of the network switch 170 to the network switch 110, and the controller 142 detects a link up at port P7 of the network switch 140 to the network switch 110. Then, the controller 172 re-defines a logical interface to the network switch 110 to include ports P4, P6 and P8 for example, and the controller 142 re-defines a logical interface to the network switch 110 to include ports P5, P7 and P8 for example. Thus, the parallel links between the network switch 110 and the network switch 140 are re-formed into the first LAG and the parallel links between the network switch 110 and the network switch 170 are re-formed into the second LAG.

Then, when the network switch 110 handles network traffic to and from the network switch 140 based on the first logical interface, the network traffic is communicated over the re-formed first LAG. Similarly, when the network switch 110 handles network traffic to and from the network switch 170 based on the second logical interface, the network traffic is communicated over the re-formed second LAG.

It is noted that the network switches 110, 140 and 170 can use any suitable technique to discover neighbor network switches and parallel links, and can use any suitable technique to self-form LAGs based on the discovered information. In an example, a link discovery protocol, such as Cisco discovery protocol (CDP), link layer discovery protocol (LLDP), and the like is used in the network 100 to discover the neighbor network switches and parallel links. In another example, a link aggregation protocol, such as link aggregation control protocol (LACP), and the like, is used to form the LAG based on the discovered neighbor network switches and the parallel links.

In an embodiment, the LLDP and the LACP are supported by the network switches 110, 140 and 170. The LLDP is used to discover neighbor network switches and parallel links, and the LACP is used to form LAGs based on the discovered neighbor network switches and parallel links.

During operation, in the embodiment, according to the LLDP, each of the network switches 110, 140 and 170 broadcasts or multicasts an announcement packet out of each port. The announcement packet from a network switch includes an identification of the network switch (N-ID). The identification can be any suitable parameter that uniquely identifies the network switch in the network 100. In the FIG. 1 example, the identification of the network switch 110 is A, the identification of the network switch 140 is B, and the identification of the network switch 170 is C. In an embodiment, the network switches 110, 140 and 170 periodically broadcast announcement packets. In another embodiment, the network switches 110, 140 and 170 broadcast announcement packets in response to an event, such as a link up event, a link down event, and the like.

According to an aspect of the disclosure, when a network switch receives, from a port of the network switch, an incoming announcement packet, the network switch collects information from the announcement packet, and stores the collected information in the memory. In an embodiment, the network switch extracts an N-ID in the announcement packet, and stores the N-ID in association with an identification of the port (P-ID) in the memory.

In the FIG. 1 example, the network switch 110 receives a first announcement packet from the network switch 140 via port 1 of the network switch 110, a second announcement packet from the network switch 140 via port 2 of the network switch 110, a third announcement packet from the network switch 170 via port 5 of the network switch 110, a fourth announcement packet from the network switch 170 via port 6 of the network switch 110, a fifth announcement packet from the network switch 170 via port 7 of the network switch 110, and a sixth announcement packet from the network switch 170 via port 8 of the network switch 110. The network switch 110 extracts N-IDs in the announcement packets, and stores the N-IDs in association with identifications of the ingress ports in the neighbor table 116. In the FIG. 1 example, the network switch 110 stores, in a first entry of the neighbor table 116, B in association with P1; stores, in a second entry of the neighbor table 116, B in association with P2; stores, in a third entry of the neighbor table 116, C in association with P5; stores, in a fourth entry of the neighbor table 116, C in association with P6; stores, in a fifth entry of the neighbor table 116, C in association with P7; and stores, in a sixth entry of the neighbor table 116, C in association with P8.

Further, based on the information collected from the announcement packets, the network switch detects neighbor network switches and parallel links. In the FIG. 1 example, based on the table 116, the controller 112 detects a first neighbor network switch B with two parallel links respectively from port P1 and port P2 to the first neighbor network switch B, and a second neighbor network switch C with four parallel links respectively from ports P5-P8 to the second neighbor network switch C.

In an embodiment, the controller 112 assigns a same actor value to ports in the parallel links. The actor value is a value used by the LACP to define a logical interface (LI) and to form a LAG aggregating the parallel links. In the FIG. 1 example, the controller 112 assigns "1" in a field LI-ID of the first entry and the second entry in the neighbor table 116 and assigns "2" in the field LI-ID of third entry to the sixth entry in the neighbor table 116. Then, based on the assigned values, the LACP allows the network switch 110 to define a first logical interface including ports P1 and P2, and a second logical interface including ports P5-P8.

Similarly, the network switch 140 defines a logical interface including ports P5 and P8 and the network switch 170 defines a logical interface including ports P3, P4, P6 and P8. Thus, the parallel links between the network switch 110 and the network switch 140 are aggregated in a first LAG, and the parallel links between the network switch 110 and the network switch 170 are aggregated in a second LAG.

It is noted that the controllers 112, 142 and 172 can be implemented using any suitable technique. In an example, the controller 112 is implemented as integrated circuits. In another example, the controller 112 is implemented as software instructions executed by a processor.

Figure 2:
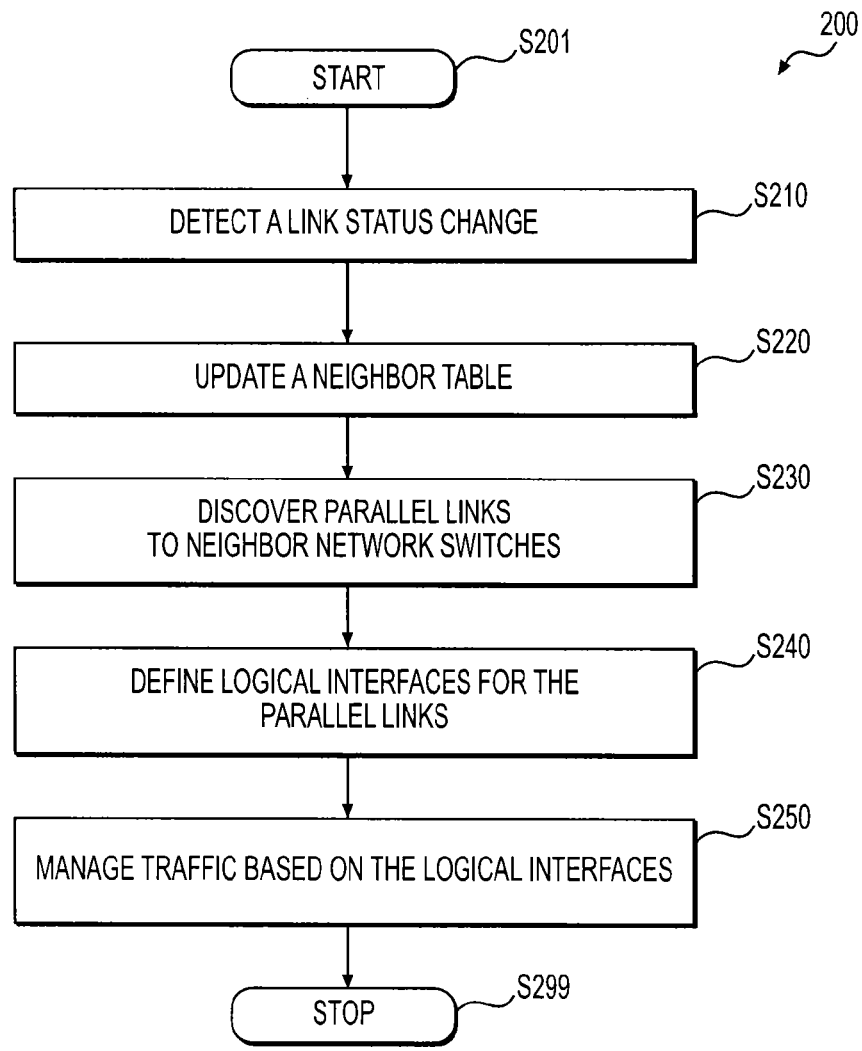
FIG. 2 shows a flow chart outlining a process example 200 according to an embodiment of the disclosure.

FIG. 2 shows a flow chart outlining a process example 200 according to an embodiment of the disclosure. In an example, the process 200 is executed by one or more network switches 110, 140 and 170 in the network 100. The process starts at S201 and proceeds to S210.

At S210, a link status change is detected. The link status change can be a link up or a link down. In the FIG. 1 example, when the Ethernet cable plugged in port P3 of the network switch 170 is unplugged, the network switch 110 and the network switch 170 detect a link down. Further, in an example, when the unplugged Ethernet cable is plugged in port P5 of the network switch 140, the network switch 110 and the network switch 140 detect a link up.

At S220, a neighbor table is updated. In an example, the network switch 110 receives announcement packets from neighbor network switches, and updates the neighbor table 116 based on the announcement packets. In an example, the network switches 110,140 and 170 in the network 100 send announcement packets to neighbor network switches periodically. In another example, the network switches 110, 140, and 170 send the announcement packets in response to one or more link status changes.

At S230, parallel links to ports of neighbor network switches are discovered. In the FIG. 1 example, based on the neighbor table 116, the controller 112 identifies parallel links to ports of the same neighbor network switch.

At 240, logical interfaces for the parallel links are defined. In the FIG. 1 example, the controller 112 assigns a same actor value to ports with parallel links to a same network switch. Then, based on the assigned actor value, a suitable protocol, such as the LACP, allows the network switch 110 to define a logical interface to include the ports with the parallel links to the same network switch. In an embodiment, logical interfaces are respectively defined by network switches at both sides of the parallel links, and thus the parallel links are aggregated in a LAG.

At S250, network traffic is communicated based on the logical interfaces. In an example, when a logical interface is defined, the ports in the logical interface are configured to appear as inactive. Thus, network traffic is transmitted and received over the logical interface instead of individual ports. Then the process proceeds to S299 and terminates.

Figure 3:
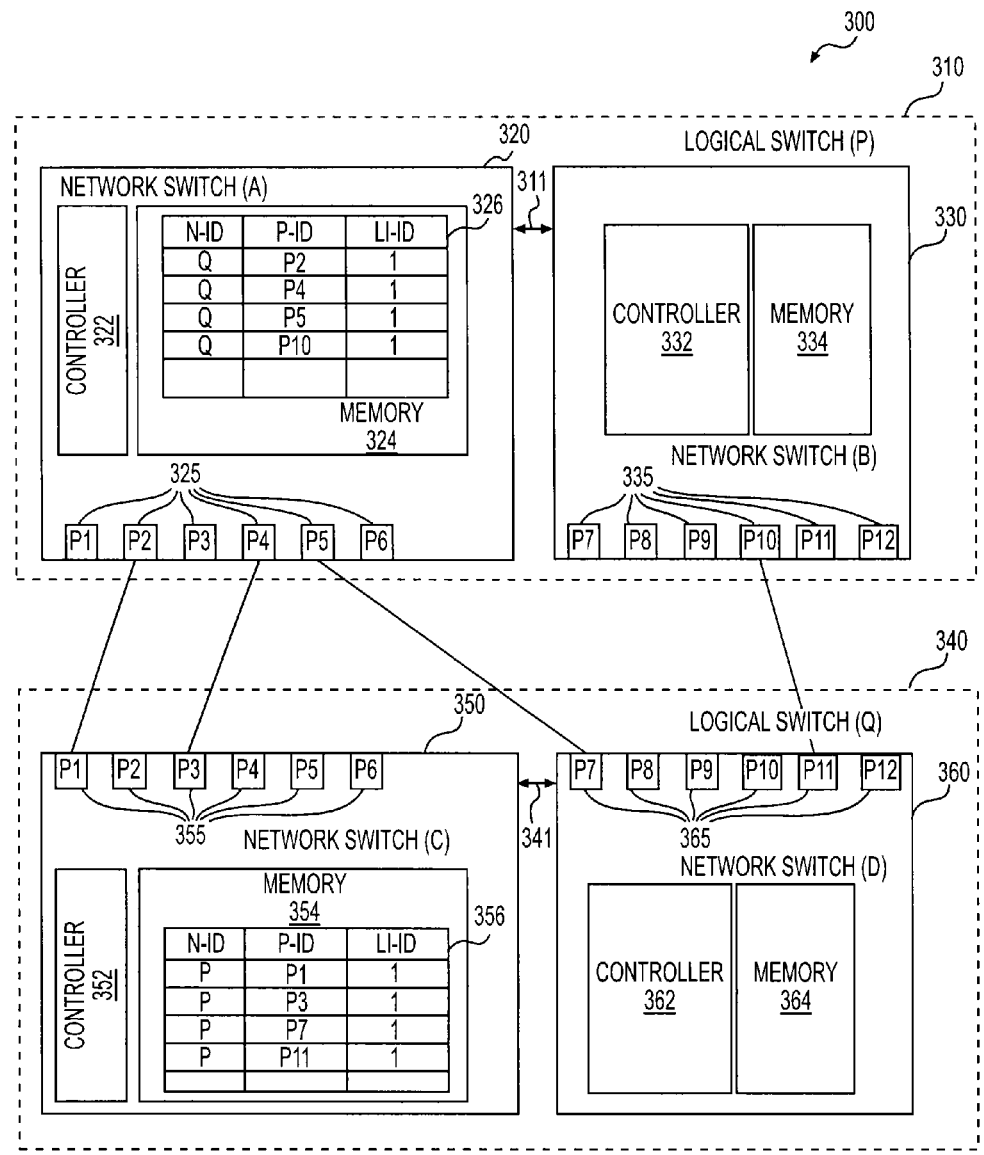
FIG. 3 shows another block diagram of a network example 300 according to an embodiment of the disclosure.

FIG. 3 shows a block diagram of another network 300 according to an embodiment of the disclosure. The network 300 includes a first logical switch 310 and a second logical switch 340 coupled together. The first logical switch 310 and the second logical switch 340 are formed by multiple network switches stacked together. In an embodiment, when multiple network switches are stacked together to form a logic network switch, configurations are shared by every network switch in the stack, the multiple network switches behave similarly to a single network switch with a larger number of ports from the multiple network switches, and the stack is managed by one of the multiple network switches referred to as a master network switch.

Specifically, in the FIG. 3 example, the first logical switch 310 is formed by two network switches 320 and 330 stacked together using a stack interconnection cable 311 with two connectors respectively plugged into specific ports of the two network switches, in an embodiment. The first logical switch 310 includes a total of twelve ports P1-P12. Among all the ports, ports P1-P6 are from the network switch 320 and ports P7-P12 are from the network switch 330. The network switch 320 is the master network switch for the first logical switch 310, and serves as a control center for the first logical switch 310. The first logical switch 310 behaves similarly to a single switch with twelve ports.

Similarly, in the FIG. 3 example, the second logical switch 340 is formed by two network switches 350 and 360 stacked together using a stack interconnection cable 341. The second logical switch 340 includes a total of twelve ports P1-P12. Among all the ports, ports P1-P6 are from the network switch 350 and ports P7-P12 are from the network switch 360. The network switch 350 is the master network switch for the second logical switch 340, and serves as a control center for the second logical switch 340. The second logical switch 340 behaves similar to a single switch with twelve ports.

The first logical switch 310 and the second logical switch 340 operate similarly to the network switch 110 in the FIG. 1 example. The description has been provided above and will be omitted here for clarity purposes.

According to an aspect of the disclosure, port members in a logical interface for a LAG can be configured in different modes, such as an active member mode, a standby member mode, and the like. When a port is configured in the active member mode in a logical interface for a LAG, the port is active and network traffic over the LAG can go through the port. When a port is configured in the standby member mode, network traffic over the LAG does not go through the port. In an example, to achieve accurate load balancing among links in a LAG, ports with the same or faster speed are configured in the active member mode, and slower ports are configured in the standby member mode. Port status can be changed, for example, according to a state machine. In another example, a LAG has a maximum number limitation for active members, and supports for example up to eight active members.

Figure 4:
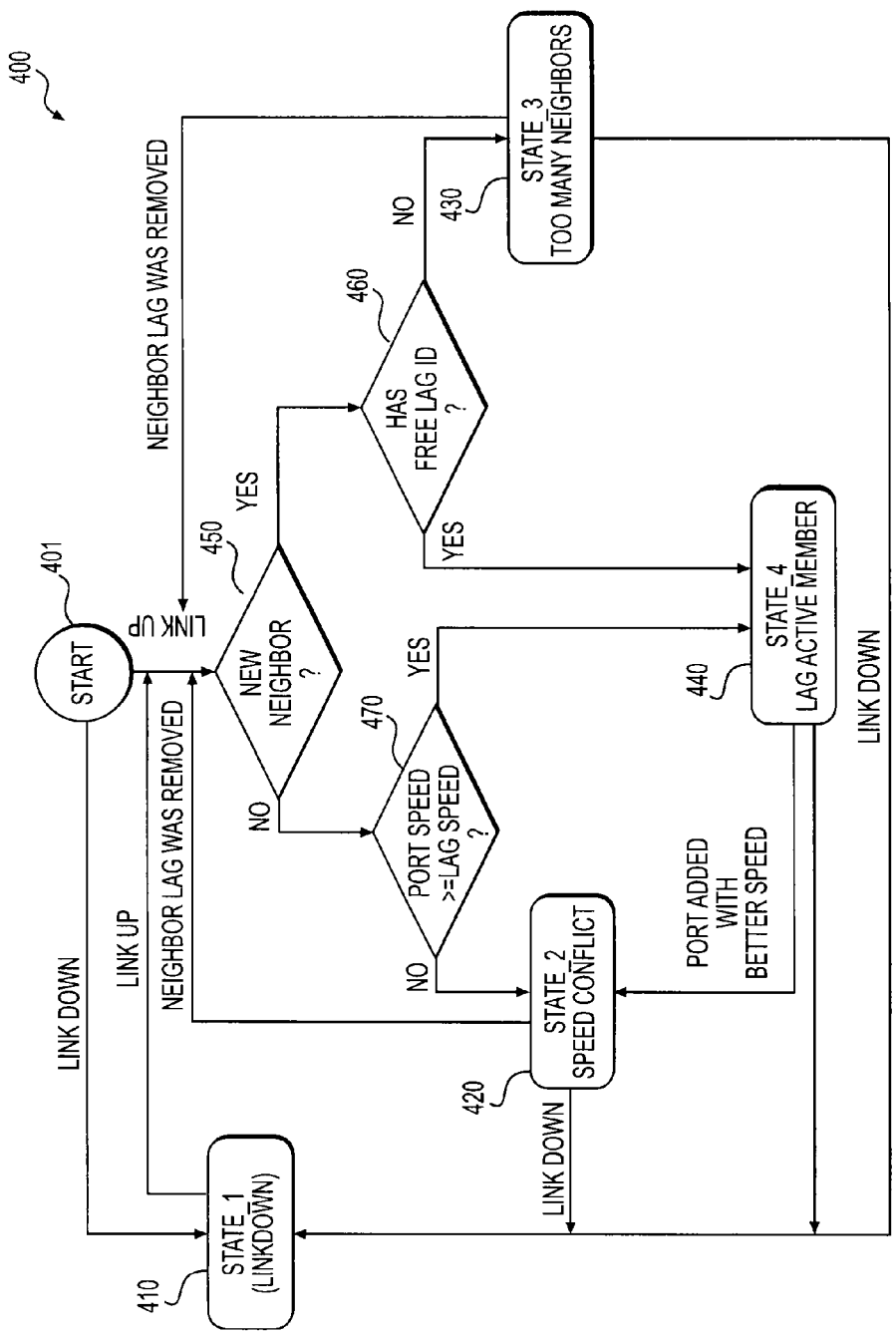
FIG. 4 shows a diagram of a state machine according to an embodiment of the disclosure.

FIG. 4 shows a diagram of a state machine example 400 to determine port status for a port in a network switch according to an embodiment of the disclosure. In an example, the state machine 400 is used by the network switches in the network 100 or the logical network switches in the network 300 to manage port status. The state machine 400 includes a first state 410, a second state 420, a third state 430 and a fourth state 440.

In the first state 410, the port is in a link down status because the port is not connected to another network switch.

In the second state 420, the port is configured in the standby member mode due to slower speed in the LAG.

In the third state 430, the port has a higher speed, and is configured in the active member mode.

In the fourth state 440, the port is configured in the standby member mode due to the reason that the LAG reaches the max number of active members.

During operation, in an example, the state machine 400 initiates at 401, and the port enters different states based on the network connection to the port, and other conditions.

At 401, when a network connection from the port to another network switch is down (link down), the port enters the first state 410.

At 401, when the network connection from the port to the other network switch is up (link up), the port enters an intermediate state (not shown) and changes state based on a plurality of determinations.

Specifically, at the intermediate state, the port enters the second state 420 if the network connection exists previously (No at 450 for new neighbor determination), and the network connection has a slower speed (No at 470 for high speed determination). At the intermediate state, the port enters the fourth state 440 if the network connection exists previously (No at 450 for new neighbor determination), and the network connection has a high speed (Yes at 470 for high speed determination). At the intermediate state, the port enters the fourth state 440 if the network connection is a new connection (Yes at 450 for new neighbor determination), and the LAG to the other network switch does not reach the maximum active member (Yes at 460 for free LAG ID determination). At the intermediate state, the port enters the third state 430 if the network connection is a new connection (Yes at 450 for new neighbor determination), and the LAG to the other network switch reaches the maximum active member (No at 460 for free LAG ID determination).

At the first state 410, when the network connection from the port to the other network switch is up (link up), the port enters the intermediate state and then changes state based on a plurality of determinations.

At the first state 410, when the network connection from the port to the other network switch is up (link up), the network connection exists previously (No at 450 for new neighbor determination), and the network connection has a high speed (Yes at 470 for high speed determination), the port enters the third state 430.

At the second state 420, when the network connection is down, the port enters the first state 410.

At the second state 420, when another network connection in the LAG is down, the port enters the intermediate state and changes state based on a plurality of determinations.

At the third state 430, when the network connection is down, the port enters the first state 410.

At the third state 430, when another network connection in the LAG is down, the port the port enters the intermediate state and changes state based on a plurality of determinations.

At the fourth state 440, when the network connection is down, the port enters the first state 410.

At the fourth state 440, when another port is added in the LAG and the newly added port has a higher speed, the port enters the second state 420.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   discovering, by a network switch, at least a first port and a second port managed by the network switch that are linked to an other network switch;
   after discovering that the first port and the second port are linked to the other network switch, defining between the network switch and the other network switch a single logical interface of which the first port and the second port are members;
   communicating network traffic between the network switch and the other network switch over the single logical interface;
   detecting a link status change in the network switch;
   re-discovering ports with parallel links to the other network switch; and
   managing the membership of the single logical interface to the other network switch to include the re-discovered ports.

2. The method of claim 1, wherein defining the single logical interface of which the first port and the second port are members further comprises:

assigning a same actor value to both the first port and the second port, the actor value indicating a group for link aggregation; and allowing a link aggregation protocol to manage a membership of the single logical interface according to the assigned actor value.

3. The method of claim 1, wherein discovering, by the network switch, at least the first port and the second port managed by the network switch being linked to the other network switch further comprises:

allowing a discovery protocol to discover a first link that links the first port to the other network switch and a second link that links the second port to the other network switch.

4. The method of claim 3, wherein allowing the discovery protocol to discover the first link that links the first port to the other network switch and the second link that links the second port to the other network switch further comprises:

receiving a first announcement packet from the other network switch via the first port; and receiving a second announcement packet from the other network switch via the second port.

5. The method of claim 4, further comprising:

storing, in a neighbor table, a first entry with an identifier of the other network switch and an identifier of the first port in response to the receiving of the first announcement packet; and storing, in the neighbor table, a second entry with the identifier of the other network switch and an identifier of the second port in response to the receiving of the second announcement packet.

6. The method of claim 5, further comprising:

detecting entries in the neighbor table with the same identifier of the other network switch.

7. The method of claim 1, wherein discovering, by the network switch, at least the first port and the second port managed by the network switch being linked to the other network switch further comprises:

discovering, by the network switch, at least the first port and the second port belonging to the network switch being linked to the other network switch.

8. The method of claim 1, wherein discovering, by the network switch, at least the first port and the second port managed by the network switch being linked to the other network switch further comprises:

discovering, by the network switch, at least the first port and the second port among first ports belonging to the network switch and second ports belonging to additional network switches that are stacked to the network switch being linked to the other network switch.

9. A network switch, comprising a controller configured to:

discover at least a first port and a second port managed by the network switch that are linked to an other network switch;

after discovering that the first port and the second port are linked to the other network switch, define between the network switch and the other network switch a single logical interface of which the first port and the second port are members; and communicate network traffic between the network switch and the other network switch over the single logical interface, wherein the controller is configured to detect a link status change, re-discover ports with parallel links to the other network switch, and manage the membership of the single logical interface to the other network switch to include the re-discovered ports.

10. The network switch of claim 9, wherein the controller is configured to:

assign a same actor value to both the first port and the second port, the actor value indicating a group for link aggregation; and allow a link aggregation protocol to manage a membership of the single logical interface according to the assigned actor value.

11. The network switch of claim 9, wherein the controller is configured to:

allow a discovery protocol to discover a first link that links the first port to the other network switch and a second link that links the second port to the other network switch.

12. The network switch of claim 11, wherein the controller is configured to:

receive a first announcement packet from the other network switch via the first port; and receive a second announcement packet from the other network switch via the second port.

13. The network switch of claim 12, wherein:

a storage medium is configured to store a neighbor table; and the controller is configured to store, in the neighbor table, a first entry with an identifier of the other network switch and an identifier of the first port in response to the receiving of the first announcement packet, and store, in the neighbor table, a second entry with the identifier of the other network switch and an identifier of the second port in response to the receiving of the second announcement packet.

14. The network switch of claim 13, wherein:

the controller is configured to detect entries in the neighbor table with the same identifier of the other network switch.

15. The network switch of claim 9, wherein the first port and the second port belong to the network switch.

16. The network switch of claim 9, wherein the first port and the second port are among first ports belonging to the network switch and second ports belonging to additional network switches that are stacked to the network switch.

17. A non-transitory computer readable medium storing program instructions for causing a processor to execute operations comprising:

discovering, by a network switch, at least a first port and a second port managed by the network switch that are linked to an other network switch;

after discovering that the first port and the second port are linked to the other network switch, defining between the network switch and the other network switch, a single logical interface of which the first port and the second port are members;

communicating network traffic between the network switch and the other network switch over the single logical interface;

detecting a link status change in the network switch;

re-discovering ports with parallel links to the other network switch; and managing the membership of the single logical interface to the other network switch to include the re-discovered ports.

18. The non-transitory computer readable medium of claim 17, wherein the operations comprises:

assigning a same actor value to both the first port and the second port, the actor value indicating an aggregation group; and allowing a link aggregation protocol to manage a membership of the single logical interface according to the assigned actor value.

\* \* \* \* \*